United States Patent [19]

Sköldheden

[11] Patent Number: 4,831,533
[45] Date of Patent: May 16, 1989

[54] SPEED CONTROL SYSTEM

[75] Inventor: Per-Harald Sköldheden, Partille, Sweden

[73] Assignee: AB Volvo, Gothenburg, Sweden

[21] Appl. No.: 57,942

[22] Filed: Jun. 3, 1987

[30] Foreign Application Priority Data

Jun. 17, 1986 [SE] Sweden ............................ 8602692

[51] Int. Cl.⁴ ...................... G05D 13/62; B60K 31/00
[52] U.S. Cl. .............................. 364/426.04; 123/352; 364/431.07
[58] Field of Search ...................... 364/431.03, 431.05, 364/431.07, 426, 431.12, 431.04, 426.04; 123/357, 352, 486, 325, 493, 306, 492

[56] References Cited

U.S. PATENT DOCUMENTS

| | | | |
|---|---|---|---|
| 2,864,352 | 12/1958 | Wells | 123/398 |
| 3,981,287 | 9/1976 | Williams et al. | 123/357 X |
| 4,472,777 | 9/1984 | Youngblood | 364/431.07 |
| 4,541,052 | 9/1985 | McCulloch | 364/431.07 |
| 4,677,560 | 6/1987 | Cao et al. | 364/431.07 |
| 4,709,335 | 11/1987 | Okamoto | 364/431.05 |

FOREIGN PATENT DOCUMENTS 2330939 1/1975 Fed. Rep. of Germany .
2442511 6/1975 Fed. Rep. of Germany .

Primary Examiner—Marvin L. Nussbaum
Attorney, Agent, or Firm—Young & Thompson

[57] ABSTRACT

A control system for controlling the fuel/air supply to the engine of an automotive vehicle comprises a sensor which is located adjacent a foot throttle pedal and operative to sense the position to which the pedal is moved, and also to generate signals corresponding to the sensed foot pedal position, and also comprises a vehicle speed sensor which is arranged to generate a signal corresponding to the speed of the vehicle. A control unit is arranged to receive as input signals at least the signal generated by the foot pedal sensor and the signal generated by the speed sensor. The control unit operates with two functions, namely a speed function which is contingent on the position of the foot pedal, and a base function for the fuel/air supply to the vehicle motor, this base function being contingent on at least the position of the foot pedal. The control unit controls the supply of fuel/air to the engine of the vehicle in a manner such that as soon as the vehicle speed at the prevailing foot pedal position exceeds the speed stipulated by the speed function the vehicle speed is regulated down to this stipulated speed, whereas immediately the vehicle speed falls down below the speed stipulated by the speed function the fuel/air supply to the engine is controlled in accordance with the base function.

8 Claims, 3 Drawing Sheets

SPEED CONTROL SYSTEM

The present invention relates to a speed control system for controlling the fuel/air flow to the engine of an automotive vehicle. Normally, the speed of an automotive vehicle is controlled with the aid of a basic function (GF) which adjusts the fuel/air supply to the engine in accordance with at least the position of the foot throttle pedal or accelerator pedal, e.g. through the agency of a throttle cable. Automotive vehicle control systems constructed in accordance with known techniques utilize base functions which are not solely dependent on the position of the foot pedal, but also on engine speed n. The drawback with such control systems is that the engine will run at mutually different engine speeds at one and the same foot pedal position, due to the changes in torque which the engine must generate in order to overcome varying road and wind conditions.

It is difficult to effect acceleration control purely on the basis of a speed function (HF), in cases in which the vehicle speed is regulated as a function of the position of the foot pedal.

This problem is solved by a control system having the characterizing features set forth below.

The inventive system incorporates a control unit which receives signals that correspond at least partly to the position of the foot pedal and at least partly to the speed of the vehicle. The control units operate with two functions, namely a speed function (HF) contingent on the position of the foot pedal, and a base function (GF) for the supply of fuel and/or air contingent on at least the foot pedal position. The control unit controls the supply of fuel and/or air to the engine in a manner such that immediately the vehicle speed exceeds the given speed dictated by the speed function (HF) for a prevailing foot pedal position, the vehicle speed is slowed down to this given speed, and such that the supply of fuel/air to the engine is controlled in accordance with the base function (GF) immediately the vehicle speed falls below the given speed dictated by the speed function. Thus, there is added to the normal base function for controlling the fuel/air supply a speed function which provides a limitation that is solely dependent on the angle of the foot pedal, and more specifically such that each foot pedal angle results in a given highest speed (i.e. a given engine speed or torque).

According to a further development of the invention the foot throttle arrangement incorporates at least one threshold position, or knee. In this case the pedal of the foot throttle arrangement is easier to manipulate prior to this threshold position and becomes stiffer when this position is passed. The threshold position can be assigned a selected vehicle speed. The driver is able to feel this threshold position quite distinctly, and is able to find a restful position for his foot with the foot pedal of the throttle in this position. The foot pedal arrangement is such as to enable the foot pedal to be moved to the threshold position with sufficient ease to prevent any appreciable strain on the foot muscles of the driver.

The foot used to operate the foot pedal becomes tired with time, particularly when driving long distances. It is difficult to maintain constantly a low speed, when driving high powered vehicles. The vehicle does not object to increases in speed, and the driver can easily become blind to the speed at which the vehicle is moving. As a result the vehicle tends to move faster and faster.

The further development of the invention is based on the concept of providing in motor vehicles a facility which will enable a desired cruising speed to be selected, the speed of the vehicle to be regulated upwardly and downwardly on the basis of this selected cruise speed.

Car cruise controls are known to the art. Such cruise controls incorporate a facility whereby on long journeys the driver of the vehicle is able to hold the car at a pre-selected desired cruising speed, by activating a switch or panel control provided to this end. Subsequent to activating this control, the driver need no longer hold his foot on the foot throttle, but may relax and take over manual control of the throttle in the event of a traffic situation which renders manual control necessary. This reversion to manual control automatically disconnects the cruise control facility. Cruise control systems are practically unusable in Europe, due to the rhythm of the traffic. Cruise controls are best suited for continuous driving over very long distances during which it is seldom necessary to change the speed of the vehicle, for instance in the deserts of the USA. The motor traffic in Europe moves with a pulsating rhythm.

The problems encountered with cruise control in pulsating traffic systems is also overcome by the further development of the invention, as set forth below.

The invention will now be described in more detail with reference to the accompanying drawings, in which FIG. 1 is a diagrammatic illustration of an embodiment of the inventive control system;

Figure 1:
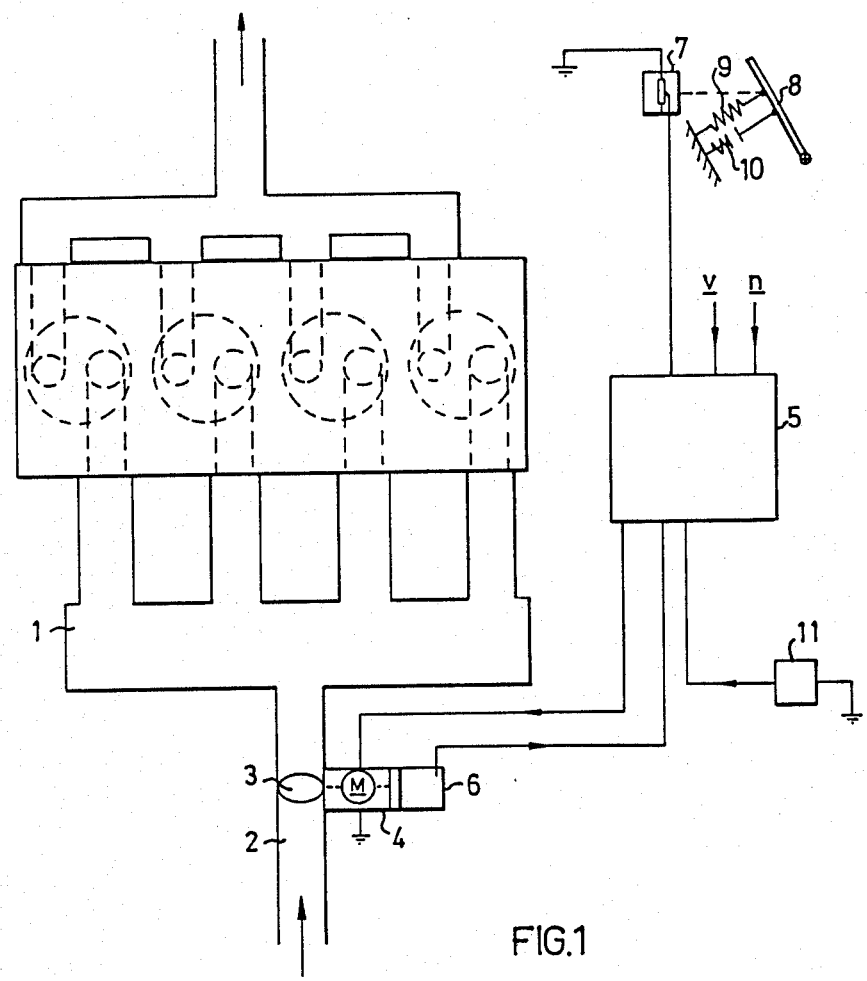

FIG. 1 illustrates schematically an internal combustion engine 1 installed in the vehicle whose speed is to be controlled or regulated. Since the engine per se is of a known kind, it will not be described in detail here. Located in the air/fuel inlet 2 is a throttle valve 3 intended for controlling engine torque. The setting of the throttle valve 3 is controlled by a throttle setting motor 4, which in turn is controlled by a control unit 5.

The control unit 5 is a programmable unit, e.g. a microprocessor having an analogue/digital converter on the inputs thereof and optionally also a digital-/analogue converter on the output leading to the setting control motor 4. The setting of the motor 4 is registered by a sensor 6 by which it is coupled to one input of the control unit. Also applied to the control unit 5 is a signal produced by an electric foot-pedal sensor 7 located adjacent the foot pedal 8. A signal v from a vehicle speed sensor and a signal n representing the engine speed are also applied to the control unit 5.

When the inventive control system is to include a threshold location in accordance with the further embodiment of the invention, the foot throttle 8 is preferably constructed mechanically in a particular manner. The foot pedal of the foot throttle is normally hinged to the floor of the driving compartment of a vehicle, as illustrated in FIG. 1. Two types of spring devices 9 and 10 are mounted between the foot pedal and a stationary element. The one spring device 9 comprises a relatively soft pressure spring located immediately between the foot pedal and the stationary element. The other spring device 10 comprises a relatively hard, pre-stressed pressure spring which extends from the stationary element towards an abutment mounted on the foot pedal and facing towards the free end of the spring. Thus, when the foot pedal is free of load, in a neutral position, the mutually facing ends of the spring 10 and the abutment are spaced apart, and do not contact one another until the foot pedal has been depressed through a commensurate distance. The aforesaid threshold location incorporated in the foot throttle arrangement is found precisely at this angular position of the hinged foot pedal. The driver can readily feel that this position has been reached, and may allow his foot to rest in this position. The spring arrangement of FIG. 1 is shown merely as an example, and can take other forms. Alternatively, hydraulic arrangements or the like may be used. The essential factor with such an arrangement is the function that it affords the foot throttle, namely that the foot pedal can be readily depressed to a given position, here referred to a as a threshold location, and that once this threshold is reached considerably more force is required to depress the foot pedal further. It will readily be seen that the foot throttle arrangement may incorporate a multiple of such threshold locations without departing from the concept of the invention, for instance by incorporating one or more spring arrangements similar to the arrangement of the spring 10.

The vehicle speed control system according to the present invention also includes a unit 11 by means of which the driver of the vehicle is able to set or select a desired speed function (HF), e.g. in the form of a desired vehicle speed applicable to the aforesaid threshold location. The unit 11 may include a switch lever or buttom which when manipulated momentarily makes a circuit, this button, or lever, being manipulated when the speed at which the vehicle is moving corresponds with the desired vehicle speed for the threshold location at that particular time. Alternatively, or as a complement thereto, the unit 11 may include a multiple switch bank installed in the vehicle driving compartment, by means of which the driver is able to choose between a number of pre-selected vehicle speeds with regard to the threshold location incorporated in the foot throttle arrangement, e.g. pre-selected speeds of 30, 50, 70, 90 and 110 km/hr. The system may also include a switch bank with which any desired speed may be freely selected with regard to said threshold location, or if a threshold facility is not utilized with which a multiple of speed functions can be selected.

When the control system incorporates a multiple of threshold locations, a unit 11 is provided for each threshold. The control unit 5 may be programmed to institute automatically a pre-determined base speed function, and the driver may effect a change in this automatic setting, through the unit 11. When the control system incorporates a threshold facility, the base speed function may correspond to a threshold speed which e.g., coincides with the maximum speed limit of a particular built-up area, or city district. When leaving the city and driving along country roads or intercity roads, for instance, the driver can then manipulate a switch on the unit 11 when the speed of the vehicle reaches the desired cruising speed. The control unit 5 may also be programmed to switch over to the base speed function when the vehicle is braked to a speed lower than a pre-determined speed, e.g. 50 km/hr, to avoid problems when the vehicle enters a built-up area from an open country road.

The control unit 5, through which a servocontrol of the vehicle speed (via the throttle-setting-motor control 4) as a function of the signal from the foot control sensor has programmed therein a base function (GF), as is normal in the case of motor vehicles, such as cars, buses, etc., in which the throttle valve angle is a function of the signal delivered by the foot throttle sensor 7. This function may be a simple function of the throttle-valve setting in relation to the angular position of the foot pedal. It is more usual, however, for present day vehicle speed control systems to incorporate far more complicated transmission functions which are also dependent on the engine speed n.

Figure 2:
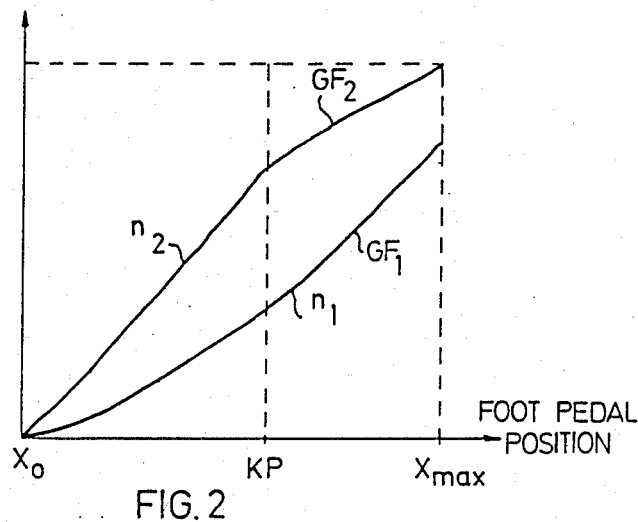
FIG. 2 is a diagram illustrating the throttle setting as a function of the position of the foot pedal at mutually different engine speeds.

The diagram of FIG. 2 illustrates by way of example two curves $GF_1$ and $GF_2$ in which the setting of the throttle valve is a basic function of the position of the foot pedal in respect of two mutually different engine speeds $n_1$ and $n_2$. The foot pedal position is normally taken as the angular position of the hinged foot pedal 8, and may extend through a throttle setting range from the neutral setting $X_0$ in which no load is exerted on the foot pedal to the maximum throttle setting $X_{max}$, in which the foot pedal is fully depressed. The vertical broken line KP indicates the aforesaid threshold location. Such diagrams as those illustrated in FIG. 2 are of the type which normally can be used for vehicle speed control purposes.

Figure 3:
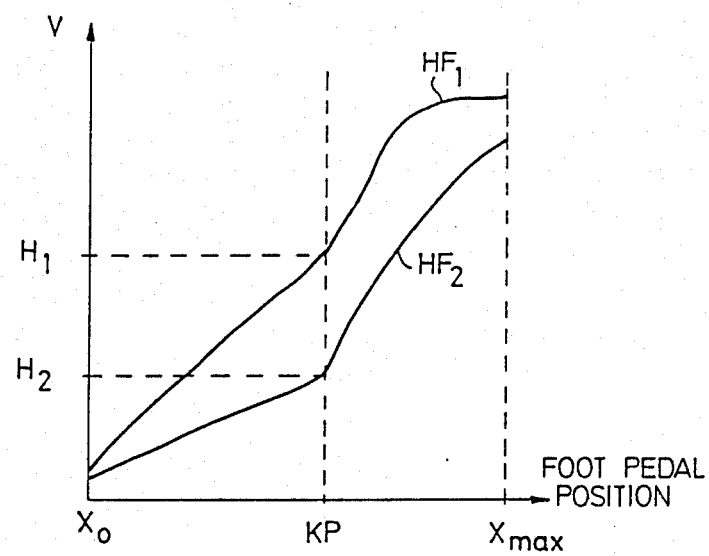
FIG. 3 is a diagram illustrating the vehicle speed as as function of the position of the foot pedal in the case of a threshold location, with two mutually different speed settings for the threshold location.

FIG. 3 illustrates diagrammatically speed functions $HF_1$ and $HF_2$ of the vehicle speed as a function of the foot pedal position at two sets of preselected speeds for the threshold KP, e.g. $H_1 = 90$ km/hr and $H_2 = 50$ km/hr. The curves may, e.g., have a linear relationship between speed and foot pedal position for pedal positions which are below the location of threshold KP and a curved function for speeds above the threshold location, as illustrated in FIG. 3, although other types of functions are conceivable. The speed functions are computed by the control unit 5, in accordance with the formuli or tables with which it is programmed. Alternatively, the control unit may be programmed with a multiple of speed functions capable of being selected through the unit 11.

The control unit 5 effects a control along the relevant prevailing base function in FIG. 2 when the vehicle speed lies below the speed denoted by the relevant prevailing speed function in FIG. 3 for the occurent throttle or foot pedal setting. Otherwise the control unit effects a control along the relevant prevailing speed function in FIG. 3.

The advantage of having both a base function (GF) according to FIG. 2 and controlling the vehicle speed according to the relevant speed function (HF) of FIG. 3 on the basis of this base function, is that the base function normal for the vehicle in question is utilized to the full in a manner precisely normal for the vehicle, particularly when accelerating the vehicle. In this way, when acceleration of the vehicle is terminated the vehicle will move at a speed given by the relevant speed function in FIG. 3. As soon as the driver relaxes the pressure on the foot throttle pedal, so as to slow down to a slower speed, the control system becomes active to adjust the throttle setting, i.e. to close the throttle down until the vehicle speed begins to approach the speed which at the prevailing angle of the foot pedal applies to the set curve. The control unit 5 then steers the throttle setting motor 4 in a manner to increase the throttle valve angle 3 slowly, so as to obtain herewith, a slight swing around the speed which shall prevail in accordance with the relevant curve 3. This control can be effected by means, for instance, of a PID-control.

The variant in which the inventive vehicle control system incorporates a threshold location affords the driver the advantage of a pre-selected cruise speed at a comfortable foot pedal position, and that the vehicle speed can be regulated on the basis of this pre-selected pedal position.

Figure 4:
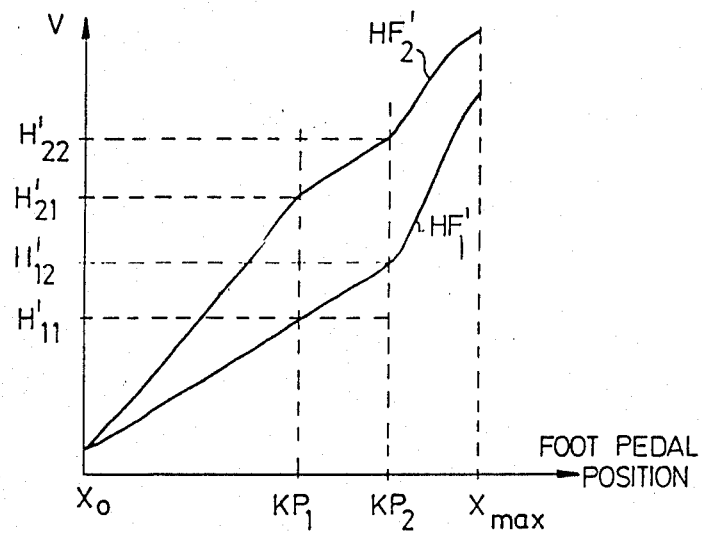
FIG. 4 illustrates two diagrams of vehicle speed as a function of foot pedal position, with two threshold locations.

FIG. 4 is a two-curve diagram showing the vehicle speed as a function of the foot pedal setting or position with a system that incorporates two threshold locations, $KP_1$, $KP_2$. The threshold location $KP_1$ on the lower curve HF', represents a pre-selected vehicle speed $H'_{11}$ of, e.g., 50 km/hr, and the other, higher threshold location $KP_2$ on said curve represents a pre-selected speed $H'_{12}$ of, e.g. 70 km/hr. The first threshold location $KF_1$ of the other curve, or speed function, $HF'_2$ represents a pre-selected vehicle speed $H'_{21}$ of, e.g., 80 km/hr, and the second, or higher, threshold location $KP_2$ on said curve represents a vehicle speed of, e.g., 100 km/hr. In the case of the system illustrated in FIG. 4 and having speed function which incorporate two threshold locations, the upper, or higher, threshold location has been selected at a vehicle speed which is 20 km/hr faster than the vehicle speed selected for the lower threshold location $KP_1$. Although this may be suitable in practice, it is possible to construct the system so that vehicle speeds can be selected freely with respect to both threshold locations, within certain limits.

It will be understood that the invention is not restricted to the described and illustrated embodiments, and that various modifications are possible within the inventive concept. For example, it is conceivable to incorporate one or more threshold locations with regard to fast pedal positions and one fixed transfer speed function in relation to the position of the foot pedal. The vehicle speeds represented by the threshold locations may also coincide with prevailing speed limits, e.g. 50 km/hr for a first threshold location, 70 km/hr for a second threshold location, 90 km/hr for a third threshold location, and so on. The advantage with this is that the driver is able to "feel" the prevailing speed limit with his foot and need not glance at the speedometer in order to ensure that he does not break the law.

I claim:

1. A control system for controlling the fuel/air flow to the engine of an automotive vehicle, said system comprising a sensor positioned adjacent a foot pedal and operative to sense the positions to which the foot pedal is moved, and also to generate signals corresponding to the sensed foot pedal positions, and also comprising a speed sensor which is operative to generate an output signal corresponding to the sensed vehicle speed, the system further comprising a control unit to which at least the signal generated by the foot pedal sensor and the signal generated by the speed sensor are applied as input signals; the improvement wherein said control unit produces an output signal responsive to said input signals for controlling the flow of air/fuel to the engine such that immediately the vehicle speed at the prevailing foot pedal position exceeds a predetermined speed, the speed of the vehicle is reduced to said predetermined speed, whereas immediately the vehicle speed falls below said predetermined speed the flow of fuel/air to the engine is increased.

2. A control system according to claim 1, and an electronic setting unit having located thereon switch keys for selecting and setting in said control unit said predetermined speed from among a plurality of selectable speeds.

3. A control system according to claim 1, characterized in that the range of foot pedal movement includes at least one threshold positon; and in that a foot throttle of the vehicle is constructed so that the foot pedal can be moved more readily during its travel before the threshold position than after the threshold position; and a setting unit that selectively assigns specific threshold speeds to the threshold or thresholds.

4. A control system according to claim 3, characterized by an electronic setting unit which is coupled to the control unit and by means of which the threshold speed or speeds can be selected; and in that the control unit is constructed to adapt the speed function to the set threshold speed.

5. A control system according to claim 4, characterized in that the setting unit incorporates a switch key for the selection of a threshold speed to the prevailing vehicle speed.

6. A control system according to claim 4, characterized in that the setting unit incorporates switch keys for selecting a threshold speed from a multiple of predetermined threshold speeds.

7. A control system according to claim 3, characterized in that the system incorporates a plurality of threshold locations in respect of gas pedal movement and that the threshold speed is adjustable for all threshold locations.

8. A control system according to claim 7, characterized in that the threshold speeds for at least two of the threshold locations have a pre-determined speed difference.

* * * * *